March 31, 1931.　　　G. GRIMSRUD　　　1,798,979
SAFETY RELEASE HITCH
Filed May 21, 1929　　　2 Sheets-Sheet 2
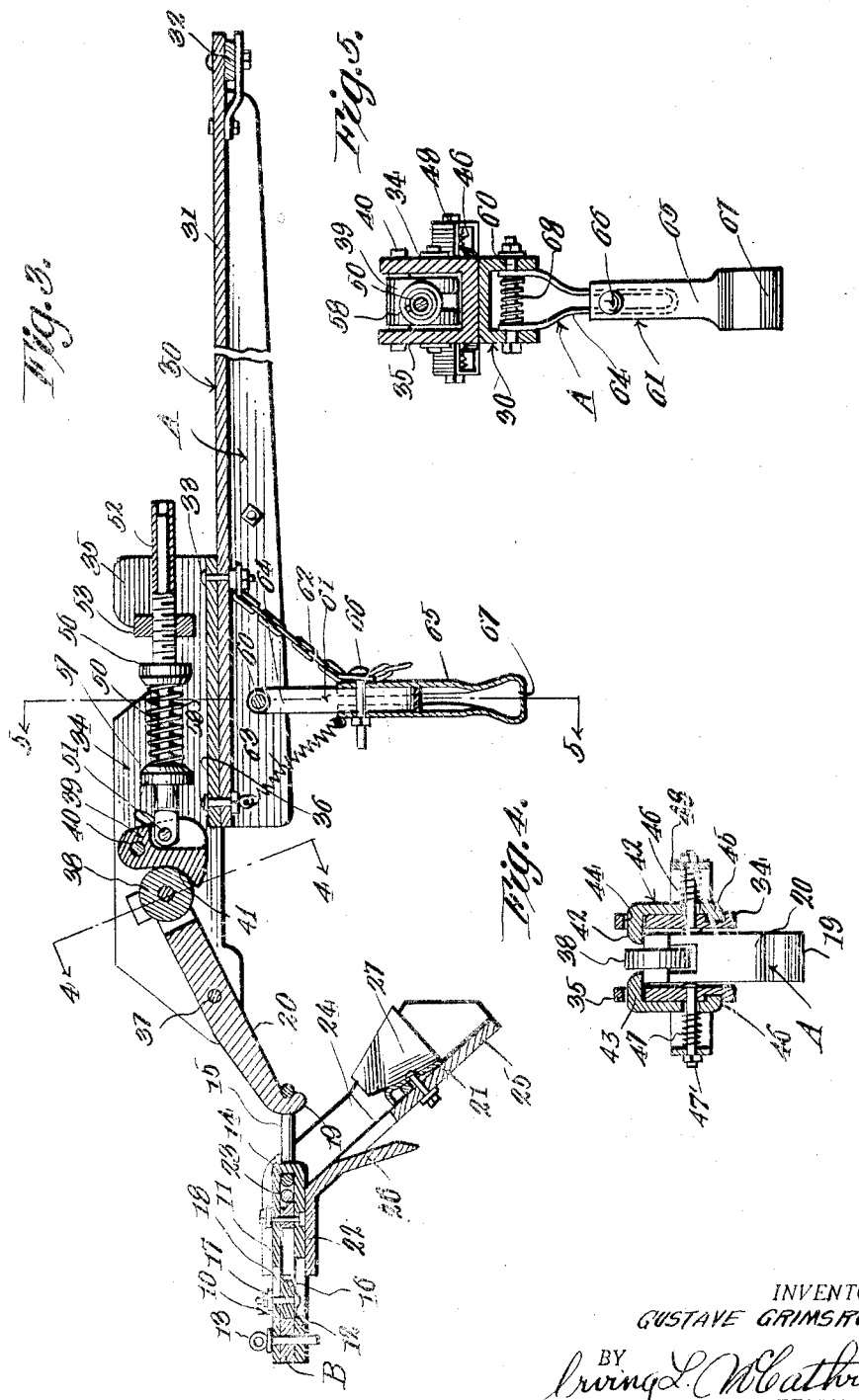
INVENTOR.
GUSTAVE GRIMSRUD
BY
Irving L. McCathran
ATTORNEYS.

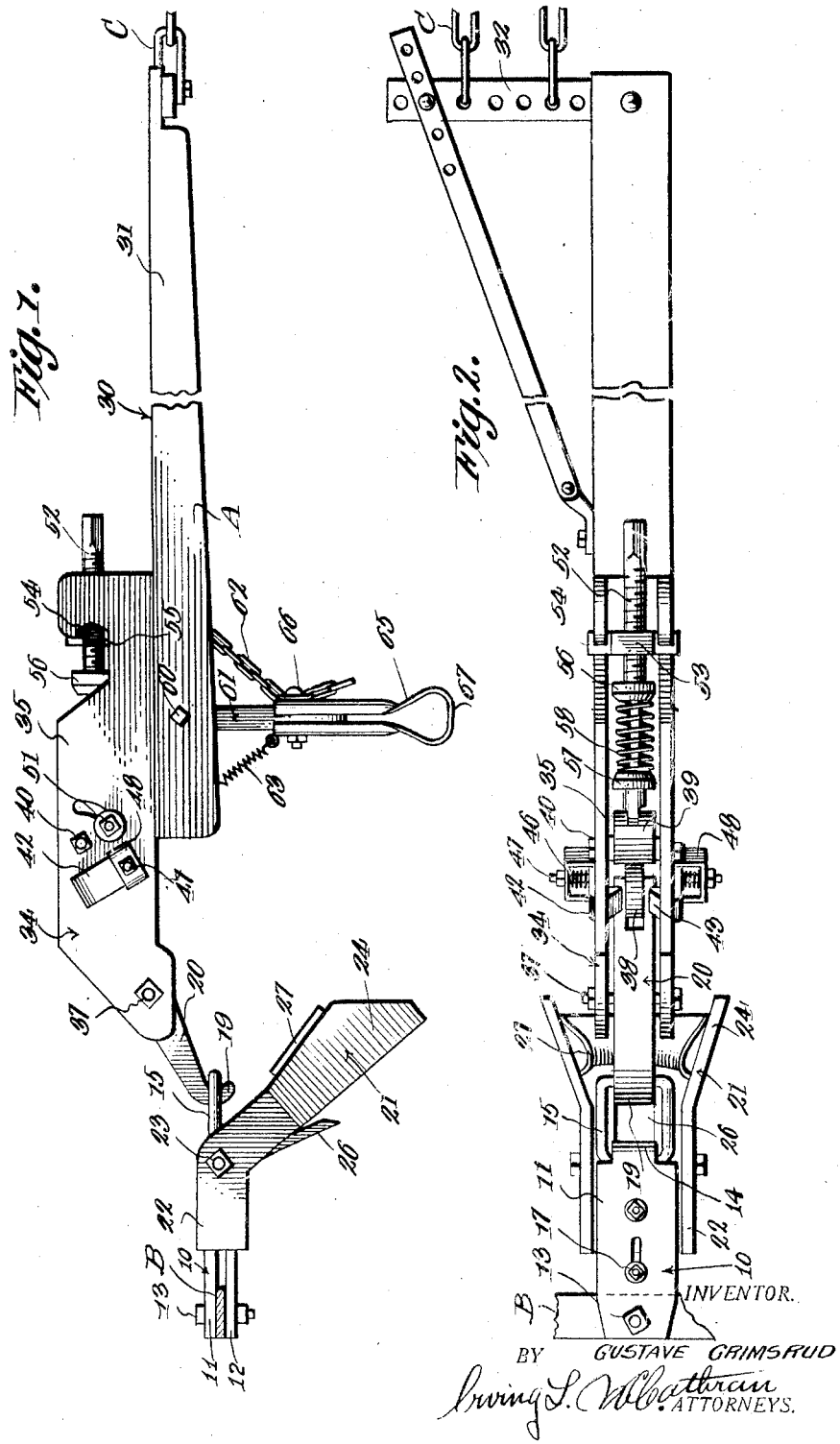

Patented Mar. 31, 1931

1,798,979

UNITED STATES PATENT OFFICE

GUSTAVE GRIMSRUD, OF ANTELOPE, MONTANA

SAFETY RELEASE HITCH

Application filed May 21, 1929. Serial No. 364,882.

This invention appertains to novel means for connecting an agricultural implement such as a plow, with a tractor, and has for one of its primary objects a tractor hitch which will automatically release the farm implement from the tractor upon the striking of a rock or other solid object by the implement, thereby preventing breakage to the implement and undue strain on the tractor, the hitch embodying novel means for permitting the automatic coupling of the implement to the tractor upon the backing of the tractor.

Another salient feature of my invention is the provision of a hitch for connecting a plow to a tractor embodying a hook for detachable connection with a clevis, the hook being normally maintained in a predetermined position by spring pressure, the hook being adapted to be automatically released from the clevis when said spring pressure is overcome by the plow hitting a solid object, means being provided for adjusting the tension of the spring so as to control the point of stress at which the hook will be released.

A further object of the invention is the provision of a novel guide scoop and pivoted link carried by the clevis, the scoop forming means for guiding the hook into engagement with the link upon backing movement of the tractor so as to permit the automatic coupling of the tractor and plow.

A further object of my invention is the provision of a novel adjustable leg carried by the hitch for limiting the downward swinging movement thereof after the hook has been automatically released from the link, so that the hook will be held in proper position for engagement with the scoop upon backing of the tractor.

A further object of the invention is the provision of novel means for mounting the scoop and leg on the hitch, whereby the scoop and leg will be free to swing in a rearward direction should the same contact with a solid object during forward movement of the tractor and plow.

A still further object of my invention is to provide an improved tractor hitch of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a side elevation of my improved hitch showing the same in operative position for drawing a plow or other farm implement;

Figure 2 is a top plan view of the same;

Figure 3 is a longitudinal section through the hitch;

Figure 4 is a detail transverse section taken on the line 4—4 of Figure 3 looking in the direction of the arrows illustrating the means employed for normally holding the hook in proper operative position, and Figure 5 is a transverse section taken on the line 5—5 of Figure 3 looking in the direction of the arrows illustrating the adjustable leg for the hitch and the means for mounting the leg in position.

Referring to the drawings in detail, wherein similar reference characters designate corresponding parts throughout the several views, the letter A generally indicates my improved hitch which comprises a clevis 10 for connection with the conventional draw bar B of a tractor (not shown). As shown, the clevis 10 includes upper and lower spaced plates 11 and 12 for straddling the draw bar B, and a removable pin 13 can be provided for connecting the clevis to the draw bar. The rear ends of the plates 11 and 12 are connected by a suitable bight portion 14 which receives the link 15, for a purpose which will be later described. If desired, a spacer plate 16 can be placed between the upper and lower plates 11 and 12 and adjustably connected in position by means of a bolt 17 extending through slots 18 formed in said top and bottom plates 11 and 12. This spacer plate 16 can be adjusted into contact with the rear face of the draw bar B, as shown. The link 15 is adapted to be detachably connected with the draw hook 20, which forms an important part of my invention and which will be more fully described, and it is to be noted that when the hook 20 is detached from the link 15, the link will drop down by gravity due to its connection with the clevis 10.

Associated with the clevis 10 is a rearwardly and downwardly inclined guide track or scoop 21 which serves as means, as will be more fully described, for guiding the hook 20 into the link 15 upon backing of the tractor after the hitch has been automatically disconnected. This scoop 21 is of a substantially U-shape in cross section and includes a forward neck portion 22 which receives the rear end of the clevis and this neck portion is pivotally connected to the clevis by means of a pivot cross bolt 23, which allows upward swinging movement of the guide or scoop, but which prevents downward swinging movement thereof, due to the contacting of the neck with the clevis. The scoop inclines downwardly and rearwardly from the neck portion 22 and the side walls 24 thereof gradually flare outwardly as shown in Figure 2 of the drawings. The bottom wall 25 of the scoop, at a point adjacent to but below the neck 23, is provided with a struck out portion 26 directly below the link 15 and the link 15 is adapted to rest on said struck out portion when the hook 20 is disengaged therefrom. In rear of the struck out portion 26 and below the same, the scoop 21 supports an upwardly inclined guide piece 27 which can be formed of sheet metal and this piece is also of substantially U-shape in cross section and when the hook 20 rides into the scoop, the hook will be raised by the guide 27 so as to permit the dropping of the hook when the same rides above the piece 27, into the link 15 so as to permit the convenient engagement of the hook with the link.

The clevis 10 is disposed forwardly of the main portion 30 of the device and this main portion 30 includes a bar 31 which can be formed of channel iron or the like, and the bar is of a substantially U-shape in cross section, as shown, and is normally disposed in a horizontal plane. The rear end of the bar can support any preferred type of draw bar 32 for permitting the clevises C of the plows (not shown) to be connected therewith. The forward end of the body 30 has bolted or otherwise secured thereto, as at 33, a casing or frame 34 which includes spaced parallel side walls 35 and a bottom wall 36 which rests against the body 30. The side walls 35 project beyond the bottom wall 36 and support the pivot pin 37 adjacent their forward ends, which pivot pin extends through the body of the hook 20 at a point substantially equi-distant its ends. The forward end of the hook 20 has formed thereon the bill 19 for engaging the link 15, while the rear end of the same is bifurcated and rotatably supports a roller 38 for a purpose which will be later described. Rockably mounted between the side walls 35 of the frame or casing 34 is the swinging lock block 39 and it is to be noted that the pivot 40 therefor extends through the block substantially at the upper end thereof so that the block depends therefrom. The forward face of the block is curved arcuately as at 41 and forms a seat for the roller 38. In order to normally hold the hook 20 against rotation in one direction and against the block 39, swinging latches 42 are provided having latch heads 43 which extend through slots 44 in the side walls 35 of the frame or casing 34, and the lower ends of the latches are provided with instruck feet 45 which are rockably fitted in recesses 46 formed in the outer faces of the side walls 35. The latches 42 are normally maintained in their latched position in engagement with the upper face of the hook 20 at its rear end by means of expansion springs 47 which are coiled about bolts 47' carried by the side walls 35 and by U-shaped brackets 48 which are secured to the side walls and straddle said bolts. It is obvious that when pull is exerted on the hook 20, the same will have a tendency to rock on its pivot 37 and move the roller 38 down against the block 39. For this reason the block 39 constitutes the lock for detachably locking the hook 20 in position and means is provided for normally holding the lock block 39 against the roller to hold the hook against swinging movement up out of engagement with the link 15 and the roller 38 against downward swinging movement past the block. This means comprises a rod 50 which is pivoted as at 51 to the rear face of the lock block 39 and the rod is telescopically and slidably received in an adjusting screw 52. The screw 52 is adjustable in a block 53, the terminals of which are provided with lugs 54 rockably mounted in recesses 55 in the side walls 35 of the frame or casing 34. The forward end of the screw 52 is provided with a head 56 while the rod 50 is provided with a similar head 57 and an expansion coil spring is placed about the rod 50 between the heads 56 and 57. The spring is of a relatively heavy type and normally pushes the rod 50 forwardly and retains the lock block in intimate contact with the roller 38 holding the lever or hook 20 against swinging movement in a crosswise direction. It is obvious that by adjusting the screw 52, the tension of the spring 58 can be regulated.

The forward end of the main body portion 30 has pivotally associated therewith as at 60 a depending supporting leg 61 and the forward movement of this leg on its pivot is limited by a flexible chain 62 which is connected with said leg and with the body 30. A contractile coil spring 63 connects the front face of the leg with the forward end of the body 30 and normally tends to move the leg to a vertical position against said chain 62. The leg preferably includes an upper section 64 and a lower section 65, and these sections are adjustably connected together by a bolt 66 so that the active length of the leg can be regulated. The leg has its lower end provided with a foot 67 for engagement with the ground when the hook 20 is disconnected from the link 15 and limits the downward swinging movement of the body 30, and the normal position of the foot 67 when the hitch is in use is about five or six inches above the ground level. If preferred, a tension spring 68 can be placed about the pivot bolt 60 for bearing against the opposite sides of the leg 61 so as to prevent undue swinging of the leg during use of the hitch.

In operation of the improved tractor hitch, the clevis 10 is connected to the draw bar B of the tractor, as shown, and the plows are connected to the draw bar 32 of the hitch, after which the hook 20 is connected to the link 15 and the parts assume the positions shown in Figures 1 and 3 of the drawings. During normal operation of the hitch, the tension of the spring 50 is sufficient to prevent swinging movement of the hook 20 in a clockwise direction and the latches 43 prevent swinging of the hook in a counterclockwise direction. However, should the plows strike a solid object such as a rock, a sudden jerk will be exerted on the hitch, which will be transmitted to the hook 20, causing a heavy downward pull on the roller 38 which will rock the lock block 39 rearwardly against the tension of the spring 50 allowing the disconnection of the bill 19 of the hook 20 from the link 15. This sudden jerk will cause the hook to be forcibly swung about its pivot 37 and the same will strike the inclined faces of the latches, causing the outward swinging movement thereof and the consequent passage of the body of the hook past the latches and the roller 38 in contact again with the lock block 39 and the hook will again assume its position as shown in Figure 3 of the drawings, ready for re-connection with the link 15. As soon as the hook 20 is disconnected from the link, the entire body 30 will drop until the foot 67 of the leg 61 hits the ground and the body will assume an angular position to the horizontal. The rock or other solid object can now be removed from out of the path of the plow and by backing the tractor the hitch can be automatically connected, in view of the fact that the scoop 21 will engage the hook, and the hook will ride up the inclined face thereof over the guide 27 and will drop into the link 15, which will rest against the struck out portion 26. Upon forward movement of the tractor, the body 30 will again straighten out and the parts will again assume the positions as shown in Figures 1 and 3 of the drawings. It is obvious that the tension of the spring 50 will control the point at which the hook 20 will disconnect from the link 15.

From the foregoing description, it can be seen that I have provided an automatic release for tractor hitches which is of an exceptionally simple and durable character and which will permit the automatic re-coupling of the parts upon backing of the tractor.

Changes in details may be made without departing from the spirit or the scope of this invention, but what I claim as new is:

1. A safety release hitch for tractors comprising a longitudinally extending body, an implement draw bar carried by the rear end of the body, a clevis for connection with the draw bar of a tractor, a link rockably carried by the clevis, a hook including a shank rockably mounted on the forward end of the body at a point intermediate its ends and having a bill formed on the forward end thereof for detachably engaging the link, a roller carried by the rear end of the shank of the hook, releasable latches engaging the upper face of the said hook at the rear end thereof for limiting counterclockwise rotation of the shank of the hook, a pivoted lock block carried by the body for engaging the roller, a guide rod pivotally secured to the lower end of the lock block, a head on said rod, a pivoted guide block carried by the body, an adjustable screw mounted in said guide block and slidably receiving the rod, a head on said screw, and an expansion spring coiled about the rod and confined between the head of the rod and said screw for normally holding the lock block in engagement with the roller for restraining swinging movement of the shank of the hook in a clockwise direction.

2. In a release hitch for tractors, an implement draw bar, a clevis for connection with the draw bar of a tractor, a link rockably carried by the clevis, a draw hook carried by the forward end of the implement draw bar for engaging the link, resilient means normally holding the hook in its engaged position, said means being adapted to be overcome when the implement strikes a solid object for releasing the hook from engagement with the link, and a scoop carried by the clevis for guiding the hook into re-engagement with the link upon backing of the tractor.

3. In a release hitch for tractors, an implement draw bar, a clevis for connection with the draw bar of a tractor, a link rockably carried by the clevis, a draw hook carried by the implement draw bar for engaging the link, resilient means normally holding the hook in its engaged position, said means being adapted to be overcome when the implement strikes a solid object for releasing the hook from engagement with the link, a scoop carried by the clevis for guiding the hook into re-engagement with the link upon backing of the tractor, and a depending leg carried by the body for limiting the downward movement thereof upon the release of the hook from said link for holding the hook in the path of the scoop.

4. In a release hitch for tractors, an implement draw bar, a clevis for connection with the draw bar of a tractor, a link rockably carried by the clevis, a draw hook carried by the implement draw bar for engaging the link, resilient means normally holding the hook in its engaged position, said means being adapted to be overcome when the implement strikes a solid object for releasing the hook from engagement with the link, a scoop carried by the clevis for guiding the hook into re-engagement with the link upon backing of the tractor, a depending leg carried by the body for limiting the downward movement thereof upon the release of the hook from said link for holding the hook in the path of the scoop, the scoop and leg being pivoted for swinging movement and means for limiting the swinging movement thereof in one direction.

5. In a safety release hitch for tractors, an implement draw bar, a hook including a shank rockably mounted at a point intermediate its ends on the forward end of said draw bar, a bill formed on the forward end of the shank, a roller carried by the rear end of the shank, a lock block rockably mounted at its upper end to the draw bar and having a seat on its forward face for receiving the roller, spring means normally urging the lock block in contact with the roller, latch plates carried by the sides of the draw bar having inwardly extending hooked ends for engaging the upper face of the shank when the roller is in contact with the lock block, the upper faces of the hooked ends of the latches being tapered to facilitate the passage of the shank past the same.

In testimony whereof I affix my signature.

GUSTAVE GRIMSRUD.